United States Patent Office.

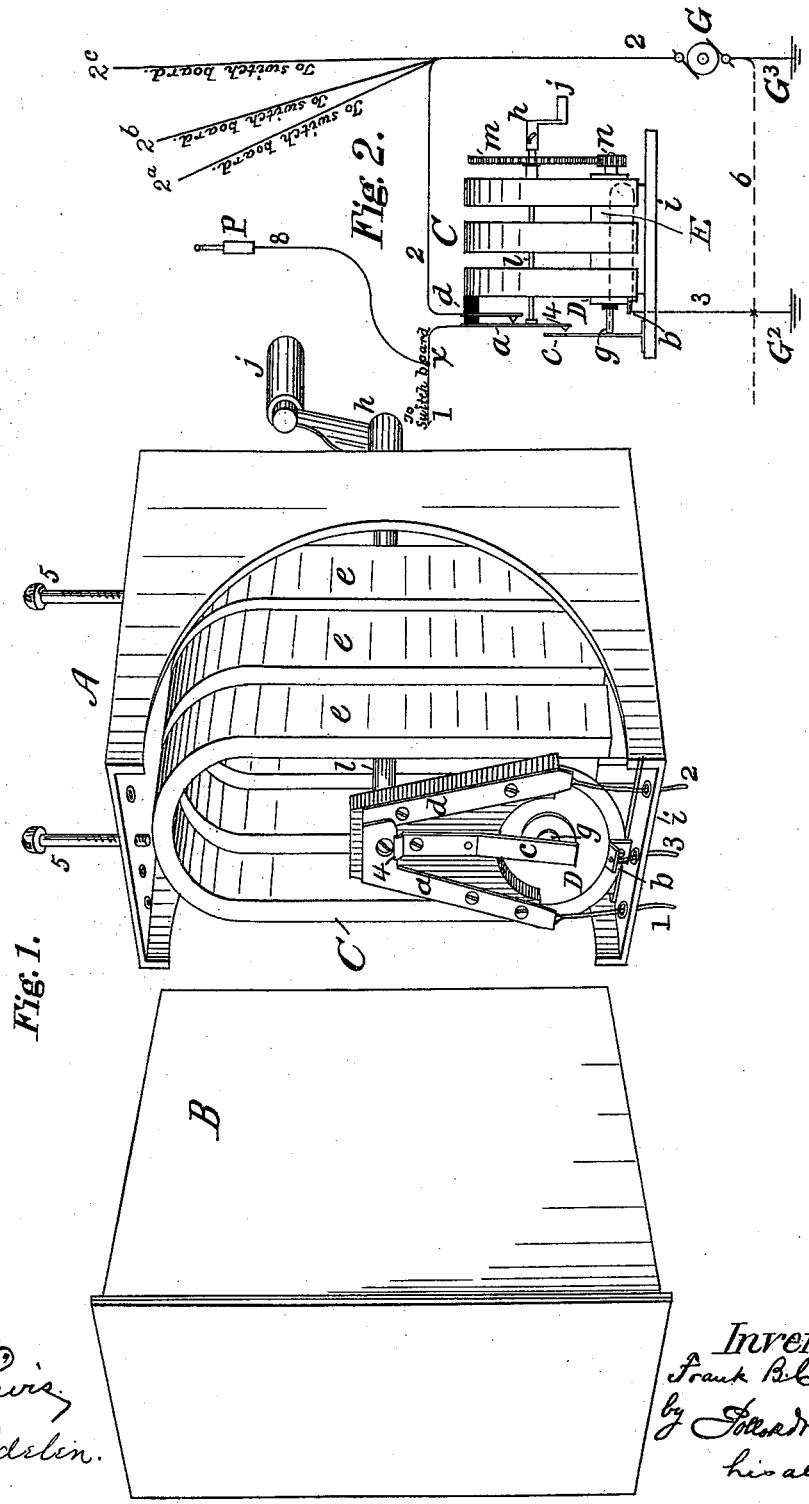

FRANK B. COOK, OF CHICAGO, ILLINOIS, ASSIGNOR TO THE AMERICAN BELL TELEPHONE COMPANY, OF BOSTON, MASSACHUSETTS.

CALL-GENERATOR CONNECTION.

SPECIFICATION forming part of Letters Patent No. 532,769, dated January 22, 1895.

Application filed November 27, 1894. Serial No. 530,163. (No model.)

*To all whom it may concern:*

Be it known that I, FRANK B. COOK, residing at Chicago, in the county of Cook and State of Illinois, have invented certain Improvements in Call-Generator Connections, of which the following is a specification.

This invention relates to magneto call generators such as are used in connection with telephone central office switch boards and other telephone systems for the purpose of sending currents of electricity to operate signals at distant or outlying stations.

At many central offices or exchanges it is customary to provide a constantly rotating main or power generator to supply electricity for the use of all the operators at the switchboard, and also to furnish each operator with a manually operated auxiliary magneto generator often called a "hand generator" as a reserve or emergency supply in case the power generator becomes from any cause temporarily inoperative. In such a combination, a manually operated switch is ordinarily provided by which the power or the hand operated generators can alternatively be brought into operative relation.

This invention relates to such a combination of power and manually operated generators and to means whereby each operator may automatically disconnect the main generator from the signaling circuit and automatically connect to the said circuit the manually operated generator. The main generator is normally so connected that by the ordinary keyboard, (not shown,) or by spring jacks and plugs its current may easily be transmitted to any line and the manually operated generators of each of the several sections are normally in open or discontinuous branches of the circuit.

I provide for each manually operated generator an associated circuit breaker through which the circuit from the power generator passes, and when the hand generator is to be used, the turning of its crank automatically disconnects or opens the power generator circuit at the circuit breaker, and immediately thereafter connects the circuit with the said open branch, thereby introducing the armature coil of the hand generator into the circuit; and upon releasing the crank the circuits are restored to their normal condition.

For a more specific elucidation of the invention, reference is made to the accompanying drawings, in which—

Figure 1 is a perspective view of a manually operated magneto generator, such as is provided for each operator at a telephone switchboard, and is shown with its cover removed; and Fig. 2 is a diagram illustrating the connections of the power and hand generators and the arrangement of apparatus whereby the former may be disconnected by the simple act of operating the latter, and automatically reconnected on the cessation of such act.

A is the inclosing box preferably made of a single metal casting in which the magneto generator C is inclosed and secured. Its front and sides are organized to open as shown in order that the parts of the generator may be accessible.

B is a suitable cover made to fit snugly over the sides of the box A so as to exclude dust, and other impurities.

5 5 are screws fitting into threads in the top of the box by means of which the box may conveniently be secured to the under side of the operator's table.

The generator C comprises several permanent magnets $e\ e\ e$, provided with common soft iron poles, between which in the field so constituted, is placed a Siemens armature E provided at one end with an insulated stud $g$ which is in contact with the plate or spring $c$ and at the other end with a pinion $n$ which meshes into the gear $m$ upon the shaft $l$ resting in bearings, all in a manner well understood.

$a$ and $d$ are contact springs insulated from each other at their fixed ends and normally in contact at their free ends; the extreme end of $a$, being normally separated from the plate $c$. The spring $a$ is connected to wire 1 which extends to the keyboard (not shown) of the same operator's section at which is placed the manually operated generator C. The armature coil is indicated by the dotted line extending from the stud $g$ to the clip $b$ with an earth connection $G^2$ extending from the latter.

The power generator G, has one of its terminals connected to earth at G³ and its remaining terminal connects by wire 2 to the spring $d$ and by the several additional branches 2ª 2ᵇ 2ᶜ with other switchboard section keyboards and their respective hand generators.

In the normal condition of the circuit, current from the continuously rotated generator G is conducted by wire 2 to spring $d$ and by its contact to spring $a$ and to line 1 which extends, as indicated, to the keyboard of the switchboard section under consideration, and through the contact breaker $d$ $a$ of the manually operated generator thereof. The wire 8 extending from the point $x$ on wire 1 to plug P indicates an alternative mode of utilizing current in calling a substation. By touching the tip of the plug to the jack or line terminal, (not shown,) of the substation, call currents are transmitted from generator G through the substation bell, returning by the earth to G³.

When the manually operated generator is to be used, its handle $h$ is turned, which causes the spindle $l$ to slide to the left (as described in United States Patent No. 273,714) to force the spring $a$ away from contact with spring $d$ and to cause it to make contact with the plate $c$, thus opening the circuit of the power generator between the springs $a$ $d$ and closing the hand generator circuit between spring $a$ and plate $c$. As the handle is turned, current is generated and passes over the circuit from the armature coil stud $g$, plate $c$, spring $a$ and wire 1; the return circuit being by way of the earth to G², and by wire 3 to the remaining generator terminal. Upon releasing the handle $h$ the shaft $l$ slides back and the circuits are restored to their normal position.

It will be understood that if the earth return circuit should be dispensed with, and the return conductor 6 substituted therefor, the operation would be the same.

Having fully described my invention, I claim—

1. In signal sending apparatus, the combination of a main or power generator normally connected with a circuit; a normally quiescent auxiliary generator; and means actuated by the operation of the auxiliary generator, for automatically disconnecting the main generator from its circuit and for connecting itself in place thereof, as set forth.

2. The combination with a signaling circuit; of a main or power generator normally associated therewith; an auxiliary or manually operated generator normally disconnected therefrom, and at rest; and mechanism for automatically disconnecting the power generator from the said circuit, and for connecting the hand generator in said circuit, the said means being actuated by putting the latter into operation.

3. In electric signaling circuits the combination of a main or power generator normally connected with and supplying current for branch conductors leading to several operators' sections; a group of normally quiescent auxiliary or hand generators located at the said operators' sections respectively, and connected in normally discontinuous auxiliary branches of the said section conductors; and means associated with each auxiliary generator, and actuated by putting it in operation, whereby the switchboard conductor may be automatically transferred from the main generator to the auxiliary generator during the said operation of the latter, substantially as specified.

4. In electric signaling circuits, the combination of a power generator, normally connected with a call circuit or circuits, one or more manually operated generators whose armatures are in normally open branches of some one of said circuits, and means to automatically disconnect the power generator from, and to connect the manually operated generator or generators in said circuit; said means consisting of a circuit breaker in each hand generator operated by the crank of the said generators, as set forth.

In testimony whereof I have signed my name to this specification, in the presence of two subscribing witnesses, this 21st day of November, 1894.

FRANK B. COOK.

Witnesses:
ALFRED A. THOMAS,
ANNA B. RAYMOND.